Jan. 9, 1962  J. P. DELANGRE ET AL  3,015,989
LIGHT-POLARIZING FILM MATERIALS AND PROCESS OF PREPARATION
Filed Jan. 27, 1958  2 Sheets-Sheet 1

INVENTORS
John Paul Delangre
and
BY Albert Cane

Froward Mikulka
ATTORNEYS

United States Patent Office 3,015,989
Patented Jan. 9, 1962

3,015,989
LIGHT-POLARIZING FILM MATERIALS AND
PROCESS OF PREPARATION
John P. Delangre and Albert Cane, Los Angeles, Calif.,
assignors to Polaroid Corporation, Cambridge, Mass.,
a corporation of Delaware
Filed Jan. 27, 1958, Ser. No. 711,297
16 Claims. (Cl. 88—65)

This invention relates to improved light-polarizing film materials, to light-polarizing images of improved quality formed in molecularly oriented film materials, and to a method of forming said light-polarizing film materials and images.

Objects of the invention are to provide an improved light-polarizing film material which incorporates a mordant and at least a dichroic direct cotton dye distributed therein in a manner so as either to polarize light uniformly throughout its area or to polarize light differentially in image areas thereof; to provide a light-polarizing film material of the character described comprising a molecularly oriented, hydroxyl-containing vinyl polymer which has been at least in part reacted with a salt of an amino aldehyde to form, wherever reacted, an amino acetal of the polymer; to provide a light-polarizing film material of the character described comprising both a molecularly oriented, hydroxyl-containing vinyl polymer and a molecularly oriented amino acetal of the polymer; to provide a light-polarizing film of the character described wherein a hydroxyl-containing vinyl polymer in the form of a molecularly oriented film has had a solution of an amino aldehyde imbibed into a surface thereof to form an amino acetal of said polymer therewithin; to provide a novel light-polarizing film material of the character described wherein, respectively, the hydroxyl-containing vinyl polymer is polyvinyl alcohol and wherein the amino aldehyde or derivative is paradimethylaminobenzaldehyde or a normal or quaternary salt thereof; and to provide a light-polarizing film material of the character described wherein there exists a direct relation between the amino aldehyde content and the axial ratio of the film.

Further objects of the invention are to provide a novel light polarizer which exhibits improved dye receptivity, dye fastness and dye density; to provide dichroic dye light-polarizing image areas which are held fixed against lateral diffusion and which have improved definition; and to provide light polarizers of the character described in the form of cut film and motion picture film which are bonded to support or base materials and which may constitute or comprise stereoscopic pairs of light-polarizing images, one image of a stereoscopic pair having a polarizing direction angularly disposed, i.e., at 90°, with respect to that of the other and being rendered in black-and-white or in one or more colors.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
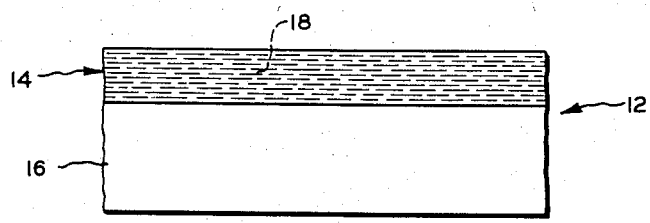
FIGURE 1 is a diagrammatic side view of a film material of the invention adapted to be used in forming a light polarizer.

Known methods of producing light-polarizing film materials include that of imbibing a dichroic substance such as an iodine stain or a dichroic direct cotton dye into a plastic film material of a type adapted to be stretched to provide therein a high degree of molecular orientation. The plastic film material may, for example, be composed of a transparent, molecularly oriented, linear, high molecular weight, hydroxyl-containing vinyl polymer, a preferred form of said material being polyvinyl alcohol. Where the dichroic dye is adsorbed by the film material, the latter is rendered light polarizing. The dichroic dye may be distributed uniformly throughout the film material, in which instance a light-polarizing sheet of substantially uniform density is provided which may be employed for various purposes in the ophthalmic and photographic fields such as in the production of light-polarizing lenses and filters. On the other hand, the dye may be distributed differentially throughout the film material, as provided by a half- or full-tone printing or transfer method in the formation of light-polarizing images of photographic quality. Such images are employed in forming stereoscopic prints in which the right- and left-eye polarizing images usually have their polarizing directions extending at 90°, with respect to one another. This is made possible by printing from printing matrices or other printing means each of a stereo pair of black-and-white dichroic dye images or the several color images making up a pair of stereoscopic images in full color on individual molecularly oriented films of the type above described, the two films of a stereoscopic pair being laminated to a support in superposed relation and with their directions of molecular orientation preferably being relatively disposed at 90°. It is to the latter, or image-bearing, type of light-polarizing film material that the present invention is particularly directed.

In the production of light-polarizing film materials of the hereinbefore-mentioned type, the inclusion, in certain instances, of a dye mordant has been known to improve dye fastness and density and, where light-polarizing images are involved, to enhance the image definition. This procedure has been of particular importance in producing stereoscopic light-polarizing images in full color, as by a subtractive printing process where, for example, each image of a stereoscopic pair is a composite image formed of three, generally overlying, aqueous, dichroic, direct cotton dye solutions which are successively applied from printing matrices. The dye images, thus printed, are each of an individual color and, for either the left- or right-eye image of a stereoscopic pair, are formed on a single molecularly oriented film of polyvinyl alcohol. Prior to the application of each dye image, the film is usually treated with a prewetting liquid such as water or a solution of sodium acetate to facilitate the dye transfer. Because of this repeated subjection to aqueous dye and other solutions, the necessity for holding fast each color image will be apparent.

Mordants of the character heretofore employed in conjunction with molecularly oriented polyvinyl alcohol and dichroic dyes to form light polarizers have included those generically characterized as being within the class of organic compounds which contain basic nitrogen. The present invention is also concerned with film materials employing one or more molecularly oriented layers or sheets of polyvinyl alcohol but wherein there is incorporated as a mordant the reaction product of a hydroxyl-containing vinyl polymer and an amino aldehyde or a derivative of an amino aldehyde, the polymer preferably being polyvinyl alcohol and the reaction product an amino acetal of polyvinyl alcohol.

Several methods are possible for providing the mordanting feature of the film material of the invention. One procedure contemplates the addition of the aldehyde reactant to the vinyl polymer in solution in the presence of an acid catalyst to form a reaction product comprising an amino acetal of the polymer; casting the film from said reaction product; then molecularly orienting and dyeing the film. A second process involves the addition of the aldehyde reactant to the vinyl polymer in solution in the presence of an acid catalyst to form a reaction product comprising an amino acetal of the polymer; isolating and purifying this reaction product; adding the reaction product to a further solution of the polymer to form a mixture; casting the mixture into a film; then molecularly orienting and dyeing the film. A third method contemplates imbibing the aldehyde reactant into an already-formed film of the vinyl polymer in the presence of an acid to form the reaction product therewithin and then dyeing the film. Depending upon which of the foregoing methods is employed in forming the light-polarizing film materials, certain differences of structure will be seen to exist, as explained below with reference to the drawings; however, each film will be noted as functioning in a manner generally similar to that of another. Irrespective of the structure of the film material thus obtained, it will be noted that, in contrast to conventional light polarizers which are formed throughout of molecularly oriented and dyed polyvinyl alcohol, the present light-polarizing film material comprises, in light-polarizing portions, a molecularly oriented and dyed amino acetal of polyvinyl alcohol.

A preferred amino aldehyde for use as a reactant in producing the mordant of the invention is para-dimethylaminobenzaldehyde or a derivative thereof as, for example, a quaternary ammonium salt, as exemplified by benzaldehyde-4-trimethyl ammonium iodide and the formula:

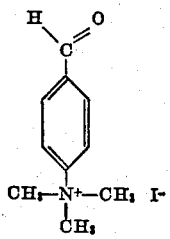

The reaction product of the quaternary ammonium salt and polyvinyl alcohol, namely, an amino acetal of polyvinyl alcohol, when embodied in the film material which is subjected to opposed tensional forces and into which a dichroic direct cotton dye is imbibed, provides an improved light-polarizing film. Salts which are water soluble and which are adapted to react with polyvinyl alcohol to produce an effective mordanting agent for dichroic direct cotton dyes within a molecularly oriented film comprise such other quaternary ammonium salts as benzaldehyde-4-trimethyl ammonium methylsulfate and benzaldehyde-4-triethyl ammonium iodide and such normal salts of para-dimethylaminobenzaldehyde as the acetate, sulfate and methyl sulfonate. Film materials of the invention, comprising as a mordant an amino acetal of polyvinyl alcohol obtained through reaction of the foregoing compounds with polyvinyl alcohol, exhibit a proclivity to accept a dye through transfer from a matrix or by imbibition. They possess characteristics of improved dye density and image definition and are adapted to immobilize dichroic direct cotton dyes which are applied thereto to a degree which equals or exceeds that previously attained through the use of basic nitrogen-containing mordants in polymers of the character described.

Certain important advantages accrue to the use of an amino aldehyde such as para-dimethylaminobenzaldehyde or an amino aldehyde derivative as a reactant with polyvinyl alcohol in the production of light-polarizing films of the invention. The amino aldehyde is well adapted to production techniques wherein it is preferably provided as a water-soluble ammonium salt which is added, in the presence of an acetal catalyst, to the polyvinyl alcohol. As previously described, the method of providing the reaction can, as a matter of choice, be accomplished in several different ways, involving reacting the salt and the polyvinyl alcohol in solution, or imbibing the salt solution into the polyvinyl alcohol which is already in the form of a film to provide the reaction within the film. In the latter instance, the salt solution is preferably imbibed into the polyvinyl alcohol film before it has been stretched to attain its high molecular orientation although imbibition of the solution after stretching is possible. The polyvinyl acetal mordant is transparent and optically homogeneous with respect to the unreacted polyvinyl alcohol, is chemically compatible in all proportions, and is capable of being stretched and acquiring a high molecular orientation substantially similar to that of unreacted or partially reacted polyvinyl alcohol.

FIG. 1 illustrates diagrammatically and in highly exaggerated form a fragment of a composite film material 12 of the invention wherein a stretched, molecularly oriented, transparent plastic film 14 is bonded to a transparent plastic base 16. It may be assumed, for example, that the film 14 has been formed from a casting solution of a type above described, namely, from an aqueous solution of polyvinyl alcohol which has been at least partially reacted with a normal or quaternary salt of an amino aldehyde so as essentially to constitute an amino acetal of polyvinyl alcohol. The oriented molecular composition of the amino acetal of polyvinyl alcohol is diagrammatically shown by the shaded portions 18. Base 16 is formed of a plastic material such as cellulose acetate butyrate or cellulose triacetate which is dimensionally stable and thus contributes to the holding of layer 14 in its stretched form. A suitable bonding agent and one or more subcoats, as may be necessary, are employed for laminating films 14 and 16 together.

The method contemplated herein involves the use of dichroic direct cotton dyes in conjunction with the aforesaid molecularly oriented film comprising an amino acetal of polyvinyl alcohol to form an improved light-polarizing film material. More particularly, the invention contemplates the use of direct cotton dyes which have sulfonic acid groups, phenolic hydroxyl groups, or carboxylic acid groups. Examples of direct cotton dyes which are suitable for the purpose are Niagara Sky Blue 6B (C.I. 518) or Niagara Sky Blue (C.I. 520) for cyan; Solantine Red 8BL (C.I. 278) or Solantine Pink 4BL (C.I. 353) for magenta; and Solantine Yellow 4GL (Prototype 53) or Stilbene Yellow 3GA (C.I. 622) for yellow. In conformance with the aforesaid considerations with respect to proper dyes, it will be apparent that basic dyes which lack an acid group would be unsuitable for the purpose.

Figure 2:
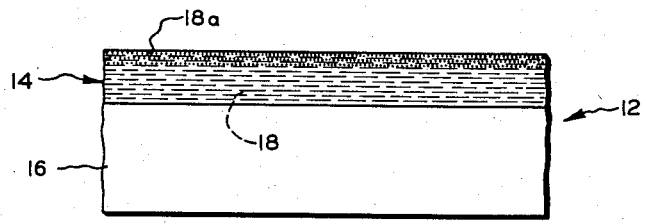
FIG. 2 is a diagrammatic side view of the film material of FIG. 1 after treatment with a dye to form a light polarizer.

FIG. 2 illustrates a highly exaggerated diagrammatic representation of a fragment of the film material of FIG. 1 wherein a dichroic direct cotton dye has been introduced into and taken up by the amino acetal groups in portion 18a. The dye is represented as having penetrated only a limited distance within film surface 14a.

Where the term "dichroic" is employed herein in connection with a dye or stain, it is meant that a molecular structure of the dye or stain is such that when it is imbibed into the molecularly oriented film material, it exhibits the property of differential absorption of the components of an incident beam of light depending upon the vibration direction of the components. Thus, it may be generally said that a dichroic direct cotton dye incorporated in a molecularly oriented film of the character described absorbs that component of the incident beam which vibrates parallel to the direction of molecular orientation of the film and transmits that component which vibrates perpendicular thereto.

The mordanting efficacy of the amino acetal of polyvinyl alcohol with respect to the dyes employed for light-polarizing purposes is believed to be principally due to the fact that this reaction product carries a positive charge and is particularly effective for use with dichroic direct cotton dyes which include acid residues in their molecular structure, as, for example, sulfonic acid groups or phenolic groups, said dyes being thereby negatively charged. The resulting electrostatic attraction between oppositely charged molecules of the mordant and dye constitutes a condition wherein the mordant attracts and holds fast the dye in a layer which is normally not readily dyeable due to its high molecular orientation, the latter condition, as will be understood, being an important requisite of its light-polarizing function.

The molecular orientation of the film layer 14, prior to its being laminated to base 16, is preferably performed by stretching the film in the presence of heat or a softening agent, the direction of orientation being substantially parallel to the direction in which the opposed tensional forces are applied. The degree of stretch imparted to a plastic film is empirically measured by what has been termed in the light-polarizing art as the axial ratio. The axial ratio is determined from a small circle printed on the film prior to stretching. The circle is converted to an ellipse by the stretching operation and the axial ratio is the ratio of the major axis to the minor axis of the ellipse. In general, high axial ratios are identified with high efficiency of the film when converted to a light polarizer. An axial ratio of the order of 3 and greater is usually considered as characteristic of a film of high molecular orientation. Current production practices, for example, are adapted to provide axial ratios of approximately 6 for molecularly oriented polyvinyl alcohol film. The present invention is principally concerned with the production of film materials of the character described bearing light-polarizing images and having an axial ratio of 4.5 or higher.

As hereinbefore intimated, the stretching operation and resulting molecular orientation operate to lengthen the time which is required for the film to accept a dichroic direct cotton dye, while the inclusion of the mordant operates to diminish the time which is required by the molecularly oriented film to accept the dye. As will be understood, from a production viewpoint, it is desirable to facilitate the dyeability of the film, and it is particularly advantageous to perform the step of transferring the dye from the matrix to the film as quickly as possible in the process of forming dichroic dye images to reduce any tendency of the dye to diffuse laterally. Thus, the molecular orientation of the film and the inclusion of the mordant operate together in the production of the improved light-polarizing film material of the invention and a direct relation between the axial ratio and the concentration of the aldehyde reactant may be considered as in general existing with respect to the film materials of the invention. While acetals of varying composition may be obtained depending upon the polyvinyl alcohol-aldehyde ratio used during their preparation and although various mixtures of polyvinyl alcohol and an amino acetal of polyvinyl alcohol may be employed, the film should preferably have a content of between 0.01 and 0.15 mol of the amino acetal groups per base mol of total vinyl alcohol groups present. In the method wherein a solution of the amino aldehyde is imbibed into a film which has already been formed, it will be understood that only the portions adjacent to the surface of the film would presumably have a concentration of the amino aldehyde according to the above-mentioned range. Thus, by way of example, assuming a condition where an axial ratio of 6 requires a concentration of the amino aldehyde reactant of 0.06 mol for satisfactory acceptance of the dye, higher axial ratios would be accompanied by higher concentrations of the reactant while lower axial ratios would be accompanied by lower concentrations.

Figure 3:
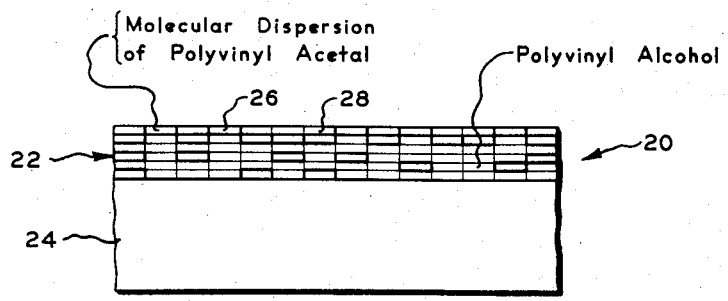
FIG. 3 is a diagrammatic side view of another film material of the invention adapted to be used in forming a light polarizer.
Figure 4:
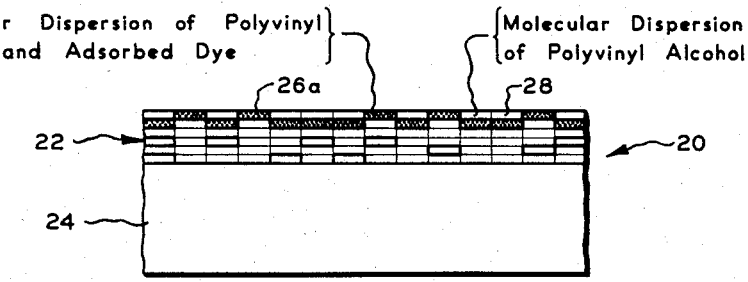
FIG. 4 is a diagrammatic side view of the film material of FIG. 3 after treatment with a dye to form a light polarizer.

FIGS. 3 and 4 are illustrative of the method in which the reaction product of the amino aldehyde and polyvinyl alcohol, namely, the amino acetal of polyvinyl alcohol, is added to a solution of polyvinyl alcohol. The resulting mixture is then cast into a film and is molecularly oriented and dyed. In FIG. 3, the composite film material 20 comprises a stretched, molecularly oriented, transparent plastic film or layer 22 which is bonded to a transparent plastic base or support layer 24. Film 22 comprises a molecular dispersion of the amino acetal of polyvinyl alcohol 26 in unreacted or substantially unreacted polyvinyl alcohol 28. It is to be understood that no exact representation of molecular structure is intended in FIGS. 3 and 4 and that the illustrations are merely diagrammatic and are exaggerated for purposes of explanation. The base and laminating substances may be of a type similar to those described relative to FIGS. 1 and 2. FIG. 4 illustrates the film of FIG. 3 into which has been imbibed a dichroic direct cotton dye, as represented by the darkened molecules 26a.

Figure 5:
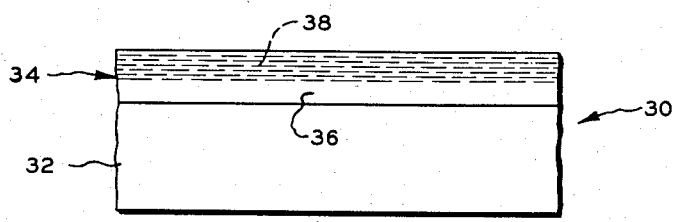
FIG. 5 is a diagrammatic side view of another film material of the invention adapted to be used in forming a light polarizer.
Figure 6:
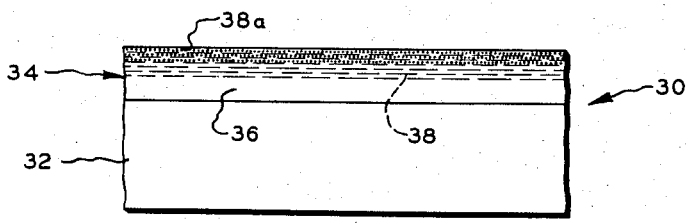
FIG. 6 is a diagrammatic side view of the film material of FIG. 5 after treatment with a dye to form a light polarizer.

FIGS. 5 and 6 illustrate the composite film 30 comprising a base 32 and a molecularly oriented layer 34, the latter having been subjected to the hereinbefore-described method of imbibing an amino aldehyde reactant into a film which has previously been molecularly oriented. Layer 34 may thus be assumed to comprise a portion 36 formed of unreacted polyvinyl alcohol and a portion 38 which comprises an amino acetal of polyvinyl alcohol. In FIG. 6, the film of FIG. 5 is shown with a dichroic direct cotton dye adsorbed therein to form the dyed portions 38a.

The following example is illustrative of the method of forming the light-polarizing film materials of the invention.

*Example*

200 grams of para-dimethylaminobenzaldehyde were dissolved in 400 ml. of absolute methanol by heating to reflux. The solution was cooled to 35° C.; then 100 ml. of methyl iodide were added and the mixture was heated to reflux for 15 hours. The mixture was transferred to a 1000 ml. beaker, covered with aluminum foil and cooled in a refrigerator. The pale yellow crystals which formed were filtered off with vacuum, washed with ether, pressed partially dry using a rubber dam, and finally dried at 150° F. to constant weight. 364 grams of the compound benzaldehyde-4-trimethyl ammonium iodide were obtained, corresponding to a 93% yield.

600 grams of polyvinyl alcohol were dissolved by stirring into 3330 ml. of water and heating to about 75° C. When all of the polyvinyl alcohol was dissolved, 10 ml. of concentrated hydrochloric acid and 198.5 grams of the benzaldehyde-4-trimethyl ammonium iodide were added. The resulting clear solution was continuously stirred until completion of the reaction. The temperature was approximately 75° C. at the start and was gradually increased to 96° C. near the end of the reaction. A reaction time of 6½ hours was found to be satisfactory. Upon completion of the reaction, the reaction product, namely, the amino acetal of polyvinyl alcohol was filtered while hot through a silk screen and, after cooling, was ready for formulation and casting.

Figure 7:
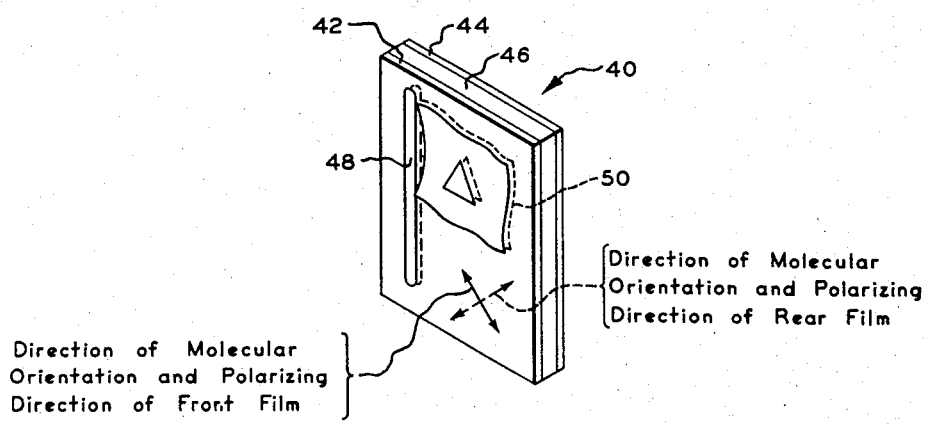
FIG. 7 is a diagrammatic perspective view of a stereoscopic print of the invention comprising a pair of light-polarizing images.

Referring to FIG. 7, there is illustrated a composite form of film unit 40 in which are employed a pair of stereoscopic dichroic dye light-polarizing images formed in mordanted film material of the invention and in which such considerations as fastness of dye, image sharpness and control of image densities, as provided by said film, are of extreme importance. For simplicity of explanation, it will be assumed that the images are rendered in monochrome. Assuming by way of illustration that the dyed layer of any one of FIGS. 2, 4 or 6 represents a light-polarizing image area rather than a uniform polarizer, the assembly of FIG. 7 may be considered as including two layers 42 and 44 each composed of a light-polarizing film of the type represented by one of said layers of FIGS. 2, 4 or 6, above described. Layers 42 and 44 are laminated to opposite sides of a transparent central supporting sheet or layer 46. It is to be understood that the aforementioned layers 42, 44 and 46 of the film unit 40 are preassembled and laminated together to form a transparent composite film or sheet structure which is supplied for use in this form and that the light-polarizing images are then printed on opposite surfaces in proper relative register, namely on the exposed surfaces of layers 42 and 44. Supporting layer 46 may be formed of any material to which layers 42 and 44 may readily be bonded and which is compatible with intended use, i.e., a sheet of cellulose acetate butyrate or cellulose triacetate.

Preferably, layers 42 and 44 are so arranged during their assembly and lamination to sheet 46 that the direction of molecular orientation of each is at 45° to an edge of the assembly and at 90° to one another, thus providing a 90° relation of the polarizing axes of each image, as indicated by the double-headed arrows. Formation of a positive left-eye image 48 and a positive right-eye image 50 on layers 42 and 44, respectively, is carried out by transferring the dichroic dye from individual left- and right-eye positive printing matrices, the printed images generally overlying one another in accordance with the usual stereoscopic relationship.

Where the stereoscopic print is rendered in full color, right- and left-eye sets of matrices, each set comprising red, green and blue color-separation positives, are employed to form the images. The three matrices of each set are impregnated, respectively, with cyan, magenta and yellow dichroic direct cotton dyes. Each matrix of a given set is then used in succession to transfer its respective color image to one of the molecularly oriented layers, for example to layer 42, the matrices of the second set being similarly employed to transfer the left-eye color images to the other molecularly oriented layer, namely layer 44. Viewing of the stereoscopic print is performed through light-polarizing glasses or viewers having polarizing axes appropriately crossed with respect to the images to be viewed.

Although the stereoscopic print assembly of FIG. 7 is shown as an individual print which may be employed as a transparency or, with the added application of a reflecting backing to layer 44, as a reflection print, and although either of said forms of individual print constitute a useful embodiment of the film material of the invention, it may also be considered as illustrative of a frame of stereoscopic motion picture film. The film material of the invention is particularly suitable for use in the motion picture field where the high magnifications involved usually require a high order of dye densities and image resolution. Because of its peculiar mordanting property with respect to dichroic direct cotton dyes, the light-polarizing film of the invention is capable of embodying dichroic dye images having densities of the order of at least 3 and an image resolution in excess of 60 lines per millimeter.

Transfer of dichroic dye images to the molecularly oriented film is performed with the film preliminarily wetted to insure that contact between the matrix and film exists throughout the image area. As hereinbefore intimated, water, an aqueous solution of sodium acetate, or some other solution of an appropriate reagent or reagents may be employed for the purpose. The prewetting step may also be employed to supplement one previously-mentioned function of the dye mordant, namely, that of lessening the time required by the stretched film to accept the dye which is due to its state of high molecular orientation.

It will be understood that where polyvinyl alcohol has been specified herein as a film material, a polyvinyl alcohol having a small residual quantity of acetate groups, i.e., a partially de-esterified polyvinyl ester, could be employed for the purpose.

Since certain changes may be made in the above product and process without departing from the scope of the invention herein involved, it is intended that all matter contained in the above description or shown in the accompanying drawings shall be interpreted as illustrative and not in a limiting sense

What is claimed is:

1. An organic dye light-polarizing film material having an improved dye density and polarizing efficiency, said film material comprising a transparent, high molecular weight, hydroxyl-containing vinyl polymer having its molecules substantially oriented in a given direction, at least one dichroic direct cotton dye contained in at least a given area of said film material so as to render said area light polarizing, and a mordant having an affinity for said dichroic direct cotton dye which enhances the receptivity of said molecularly oriented vinyl polymer for said dichroic direct cotton dye and provides a substantial insolubilization of said dye, said dye mordant comprising an amino acetal of polyvinyl alcohol, the light-polarizing film material, owing to the coaction of said vinyl polymer, dye and mordant, having a dye density which is substantially higher than that of a light-polarizing film material comprising a similar molecularly oriented vinyl polymer and dye but which is devoid of said dye mordant.

2. A film material as defined in claim 1 wherein said amino acetal of polyvinyl alcohol is the reaction product of an amino aldehyde and a polyvinyl compound containing polyvinyl alcohol hydroxyl groups.

3. A film material as defined in claim 1 wherein said amino acetal of polyvinyl alcohol is the reaction product of an amino aldehyde comprising a quaternary ammonium salt and polyvinyl alcohol.

4. A film material as defined in claim 3 wherein the concentration of said amino acetal is between 0.01 and 0.15 mole per base mol of total vinyl alcohol and wherein the axial ratio of the film material is between 3 and 8.

5. A film material as defined in claim 1 wherein said amino acetal of polyvinyl alcohol is the reaction product of a quaternary ammonium salt of para-dimethylaminobenzaldehyde and polyvinyl alcohol.

6. A light-polarizing film material, as defined in claim 1, wherein said vinyl polymer is bonded to a transparent base layer.

7. A light-polarizing film material as defined in claim 1 wherein said film material is laminated to a transparent, dimensionally-stable, plastic, supporting layer.

8. A light-polarizing film material, as defined in claim 1, wherein said dichroic direction cotton dye is distributed differentially throughout the area thereof in the form of at least one light-polarizing image.

9. A light-polarizing film material as defined in claim 6 wherein said image is a multicolor light-polarizing dye image comprising a plurality of dichroic direct cotton dyes which have been transferred to said film from a set of color-separation printing matrices.

10. A light-polarizing film material, as defined in claim 1, which is composed of two molecularly oriented layers of said material, the molecular orientation of one of said layers being substantially at 90° to that of the other, said layers being bonded to opposite faces of a transparent supporting layer, and wherein said dye is printed so as to form a pair of stereoscopic images, one on each surface of a respective molecularly oriented layer, said images being in proper register for stereoscopic viewing, said mordant also contributing to an improved definition in said images.

11. A light-polarizing film material, as defined in claim 10, wherein each of said pair of stereoscopic images is multicolored and is composed of a plurality of subtractive color-separation images in proper register.

12. A process for forming a light-polarizing film material having improved light polarization characteristics comprising the steps of preparing an aqueous solution comprising polyvinyl alcohol, casting said solution into a film, drying and solidifying said film, stretching said film in a given direction to provide a given high order of molecular orientation therewithin, laminating said film to a transparent base, applying an aqueous solution of a dichroic direct cotton dye to an external surface of said film, and, at a stage of said process prior to applying said dye solution, reacting said polyvinyl alcohol in part with an amino aldehyde in the presence of hydrochloric acid to provide, in addition to remaining substantially unreacted polyvinyl alcohol, a reaction product in said film which comprises an amino acetal of polyvinyl alcohol and which serves both as a molecularly oriented component of said film material with similarly oriented but at least partially unreacted polyvinyl alcohol and a mordanting function with respect to said dye, the process permitting a dye density in said film material which is higher than that obtainable by a similar process which omits the step of providing said amino acetal of polyvinyl alcohol to serve as a dye mordant.

13. A process for forming a light-polarizing film material as defined in claim 12, wherein said dichroic direct cotton dye is applied from a printing matrix to form a light-polarizing image within said film.

14. A process for forming a light-polarizing film material as defined in claim 12 wherein said polyvinyl alcohol and said amino aldehyde are reacted in said solution and said solution is then cast into said film.

15. A process for forming a light-polarizing film material as defined in claim 12 wherein said solution comprising polyvinyl alcohol is cast into a film and wherein said amino aldehyde in solution is imbibed into said cast film.

16. A process for forming a light-polarizing film material as defined in claim 12 wherein said polyvinyl alcohol and said amino aldehyde are reacted in said solution, wherein the reaction product is added to an additional quantity of polyvinyl alcohol in solution to form a mixture, and wherein said mixture is then cast into a film.

References Cited in the file of this patent

UNITED STATES PATENTS

| | | |
|---|---|---|
| 2,239,718 | Izard | Apr. 29, 1941 |
| 2,271,468 | Watkins | Jan. 27, 1942 |
| 2,315,373 | Land | Mar. 30, 1943 |
| 2,327,765 | Carver | Aug. 24, 1943 |
| 2,327,872 | Dahle | Aug. 24, 1943 |
| 2,416,510 | Binda | Feb. 25, 1947 |
| 2,454,515 | Land | Nov. 23, 1948 |
| 2,739,059 | Priest et al. | Mar. 20, 1956 |

OTHER REFERENCES

"Polyvinyl Alcohol, Part II," British Plastics, February 1944, pages 77–83, Jones.

"Progress with New Polymers," British Rayon and Silk Journal, September 1953, pages 65–67, Somers.